United States Patent [19]
Tsai

[11] Patent Number: 5,950,892
[45] Date of Patent: Sep. 14, 1999

[54] BICYCLE CARRIER FOR CARRYING A BICYCLE WITH A CAR

[75] Inventor: Yu-Lung Tsai, P.O. Box 63-247, Taichung, Taiwan

[73] Assignees: Yu-Lung Tsai; Chiu-Man Chang-Kao, both of Taichung Hsien, Taiwan

[21] Appl. No.: 09/049,912

[22] Filed: Mar. 30, 1998

[51] Int. Cl.[6] ..................................................... B60R 9/10
[52] U.S. Cl. ....................... 224/520; 224/497; 224/502; 224/510; 224/532; 224/924
[58] Field of Search .................................. 224/520, 497, 224/502, 510, 532, 924

[56] References Cited

U.S. PATENT DOCUMENTS

| 3,858,775 | 1/1975 | Haas | 224/924 |
|---|---|---|---|
| 5,121,862 | 6/1992 | Schmidt | 224/924 |
| 5,228,607 | 7/1993 | Tolsdorf | 224/924 |
| 5,443,189 | 8/1995 | Hirschfeld | 224/532 |

*Primary Examiner*—Linda J. Sholl
*Attorney, Agent, or Firm*—Charles E. Baxley, Esq.

[57] ABSTRACT

A bicycle carrier includes two frames between which a connecting device and an engaging device are respectively disposed. One of the frames has a tongue member extending laterally from a lower end thereof. The engaging device includes a retaining member having an open bottom and a second recess is defined in a peripheral wall of the retaining member and communicates with the open bottom so that a connecting sphere of a car is received in the retaining member via the open bottom and limited by the tongue member.

12 Claims, 8 Drawing Sheets

5,950,892

BICYCLE CARRIER FOR CARRYING A BICYCLE WITH A CAR

BACKGROUND OF THE INVENTION

1. Field of the Invention

The present invention relates to a bicycle carrier for carrying a bicycle with a car or the like and which includes two frames with a connecting means connected therebetween, an engaging means connected between two lower ends of the frames for engaged with a connecting sphere of the car, and two supporting members retractably and respectively disposed to two upper ends of the two frames.

2. Brief Description of the Prior Art

FIGS. 1 and 2 show a conventional bicycle carrier 100 which is used on a car or the like and carries a bicycle with the car. Some cars have a connecting sphere 200 disposed thereto and located above or below a rear bump thereof so that the bicycle carrier can be engaged with the connecting sphere and support a bicycle thereby. The conventional bicycle carrier 100 includes two angled frames 101 and each lower end of the two frames 101 has a tubular retaining member 102 extending laterally therefrom which has a semi-circular recess 103 defined in a free edge thereof so that the connecting sphere 200 is engaged between the two recesses 103 when the two lower ends of the frames 101 are pushed together. A connecting means 300 is adjustably connected between the two frames 101 so as to adjust a width to be opened between the two frames 101. Two supporting members 400 respectively inserted into the two top ends of the frames 101 and each of the supporting members 400 has two rods 401 extending in opposite directions from two sides thereof so as to support the bicycle's frame thereon.

It is experienced that when the connecting sphere 200 is retained between the two sleeves 102, the two sleeves 102 cannot be operated to retain the connecting sphere properly. That is to say, the bicycle carrier 100 could inclined with respect to a vertical plane passing through a center of the connecting sphere 200. This will make the bicycle supported on the two supporting members 400 not stable enough. Furthermore, the supporting member 400 each occupies too much space so that it will be a problem either when the bicycle carrier 100 is disposed on the car or disengaged apart.

The present invention provides an improved bicycle carrier which has a reliable engaging means and retractable supporting members so as to mitigate the problems as mentioned above.

SUMMARY OF THE INVENTION

In one aspect of the present invention, there is provided a bicycle carrier comprising two frames each having a lower end and an upper end, one of the two lower ends having a tongue member extending laterally therefrom and the tongue member having a first recess defined in a distal end thereof. A connecting means is adjustably connected between the two frames and two supporting members are respectively disposed to the two upper ends of the frames. An engaging means is connected between the two lower ends of the frames and includes a retaining member which has an open bottom through which a connecting sphere of a car is retained. A second recess is defined in a peripheral wall of the retaining member and communicates with the open bottom so that the connecting sphere is retained in the retaining member and limited by the tongue member.

It is an object of the present invention to provide a bicycle carrier having a tongue member to conveniently retain the connecting sphere in the retaining member of the carrier.

It is another object of the present invention to provide a bicycle carrier having two retractable supporting members disposed to two upper ends of the frames of the bicycle carrier.

How these and other objects are accomplished will become apparent from the following descriptions and from the drawings.

DETAILED DESCRIPTION OF THE PREFERRED EMBODIMENT

Figure 1:
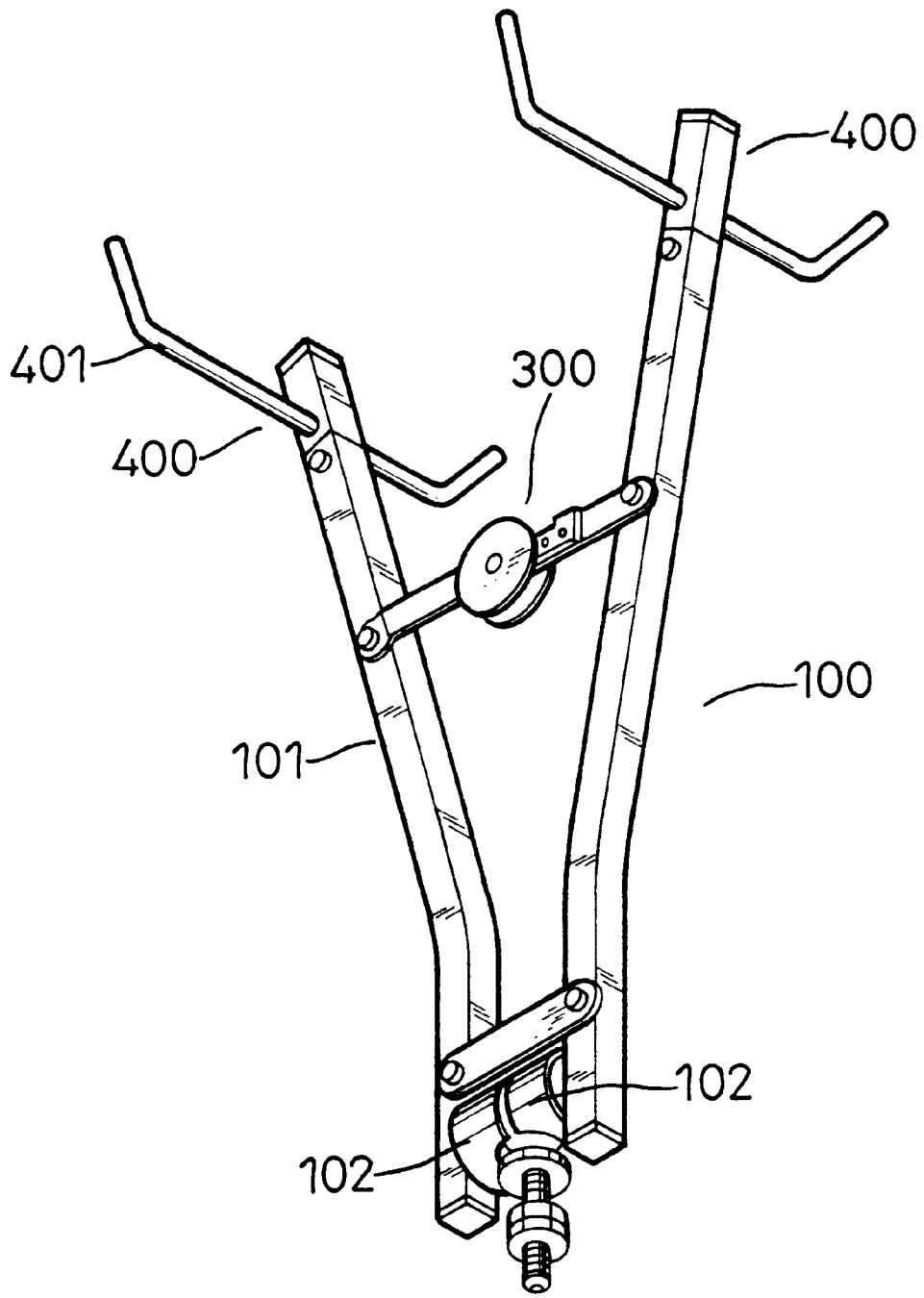
FIG. 1 is a perspective view of a conventional bicycle carrier with a connecting sphere retained thereto.
Figure 2:
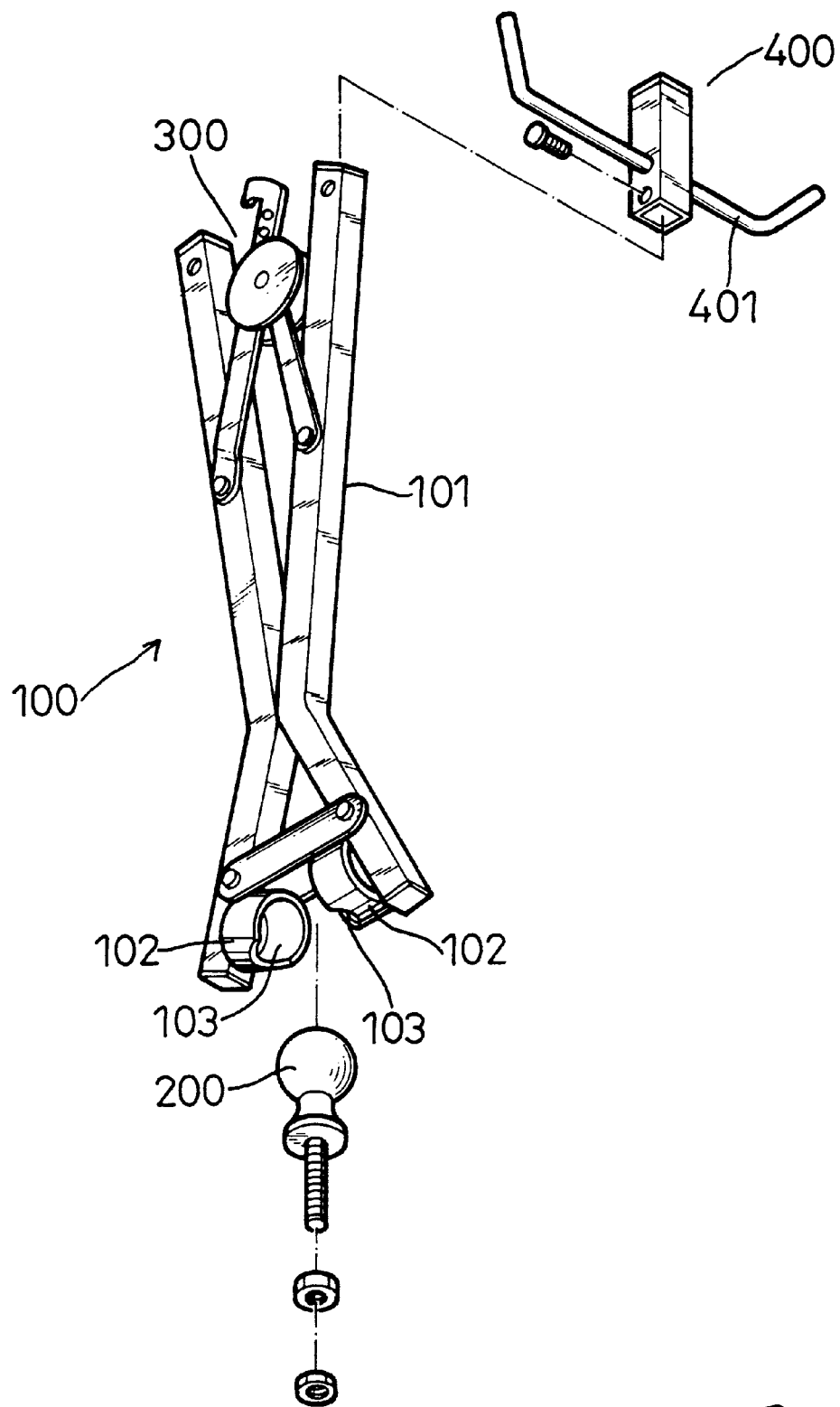
FIG. 2 is an exploded view of the conventional bicycle carrier and the connecting sphere.
Figure 3:
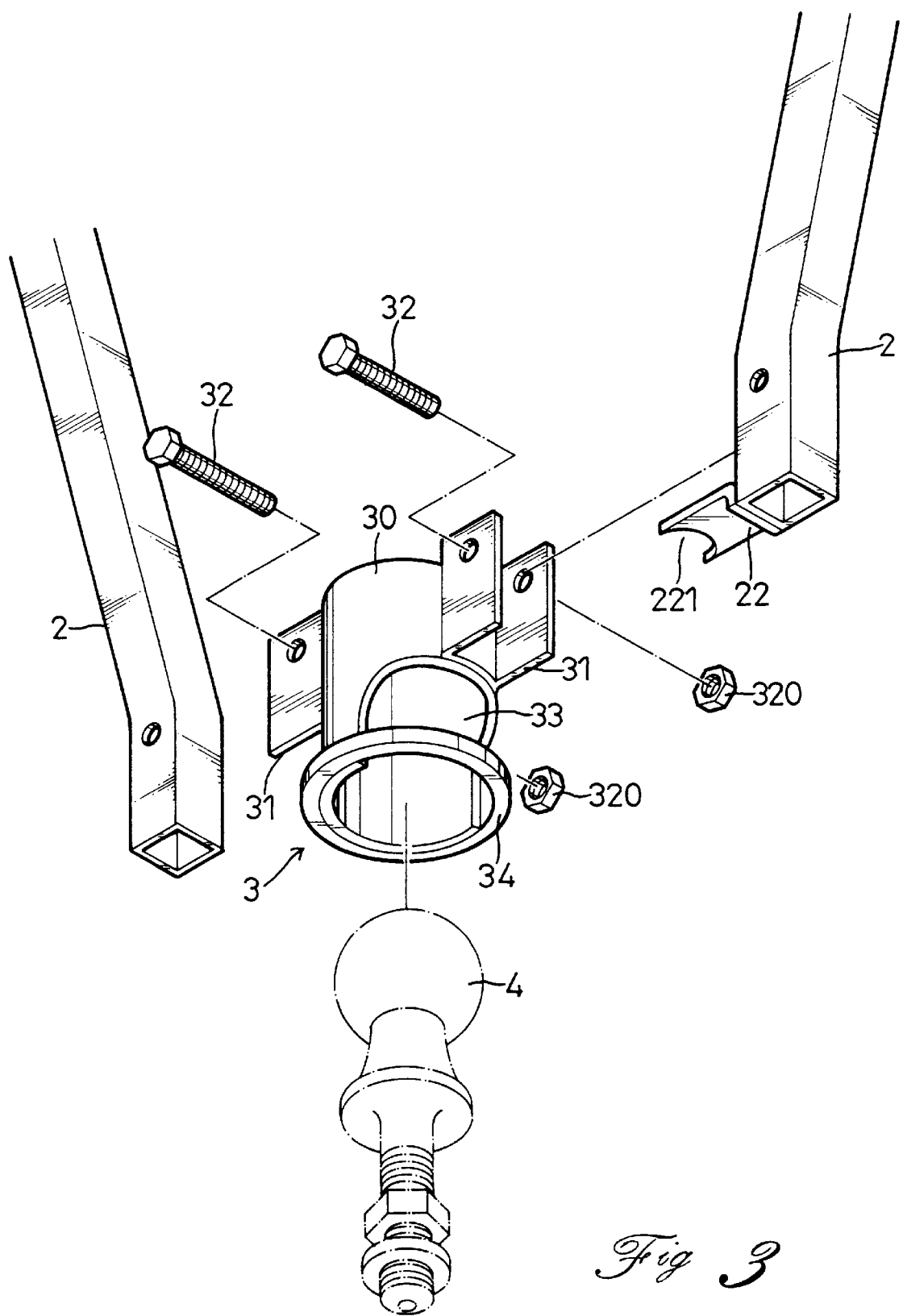
FIG. 3 is an exploded view of an lower portion of a bicycle carrier of the present invention and a connecting sphere.
Figure 4:
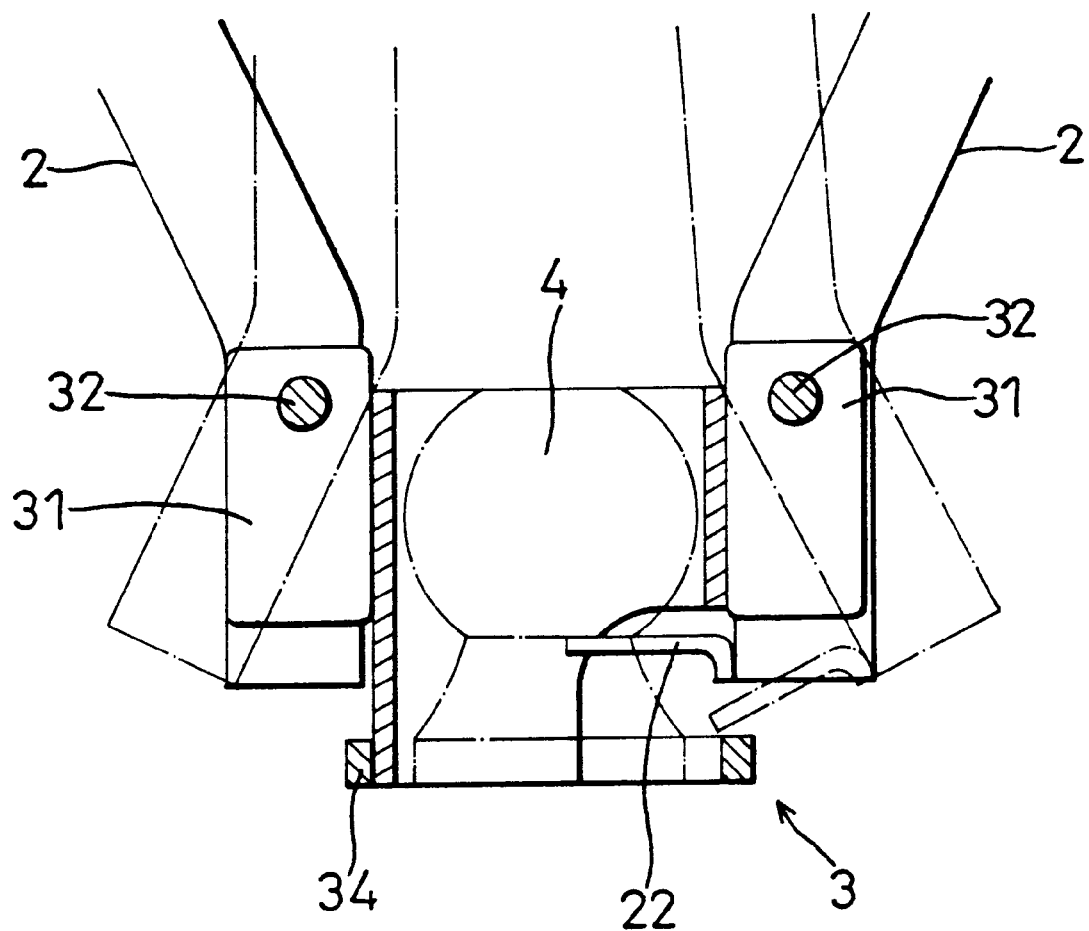
FIG. 4 is an illustrative view to show an engagement of the two frames and the connecting sphere.
Figure 7:
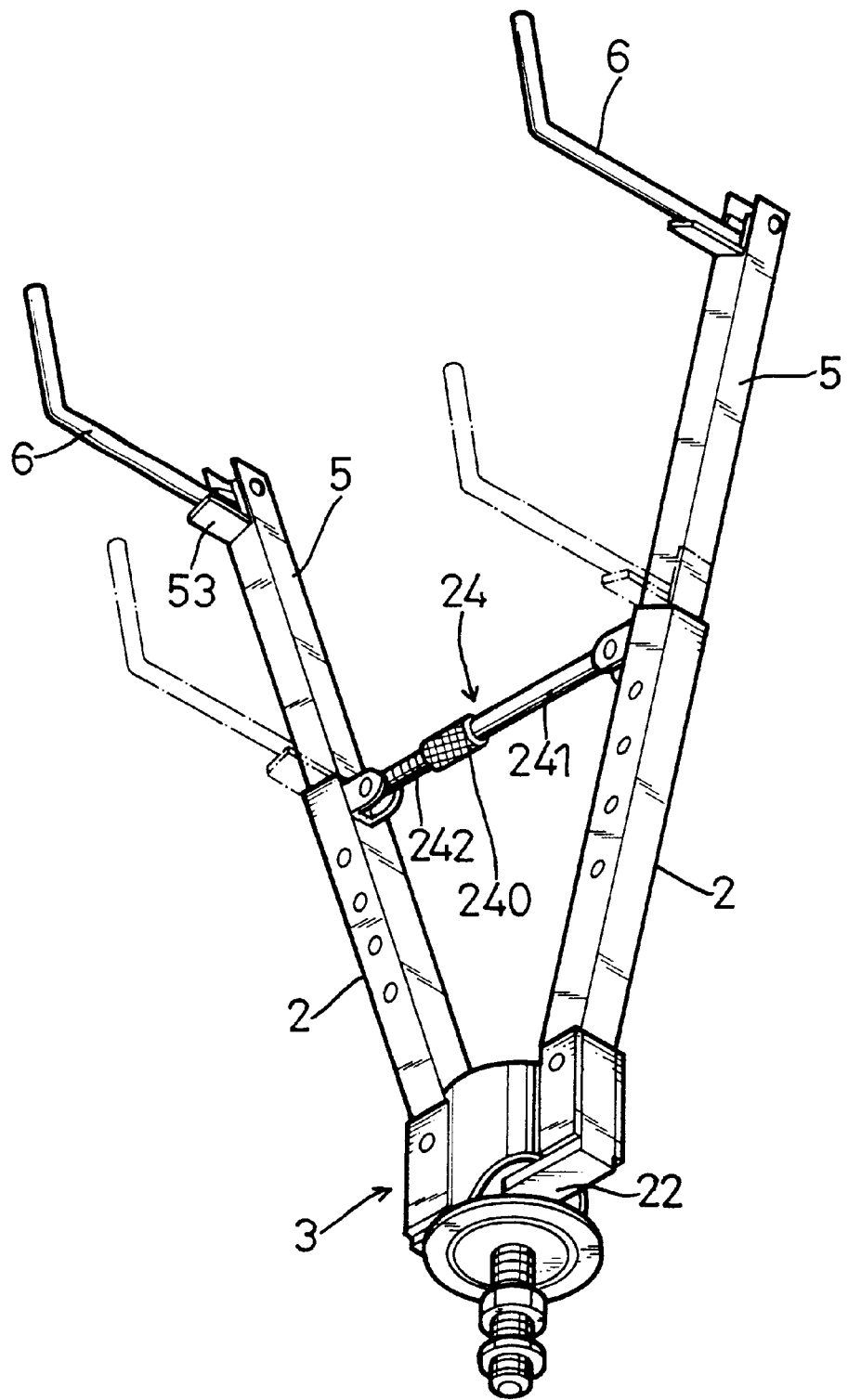
FIG. 7 is a perspective view of the bicycle carrier wherein the dotted lines show a retracted position of each of the two supporting members.

Referring to the drawings and initially to FIGS. 3, 4 and 7, a car 9 as shown in FIG. 7 has a connecting sphere 4 extending upwardly from a position below a bump thereof so as to be connected to a bicycle carrier of the present invention. The bicycle carrier comprises two frames 2 each having a lower end and an upper end, one of the two lower ends having a tongue member 22 extending laterally therefrom and the tongue member 22 having a first recess 221 defined in a distal end thereof. Each of the two frames 2 has a plurality of positioning holes 23 defined therethrough.

A connecting means 24 is adjustably connected between the two frames 2. The connecting means 24 includes a rod 241 which has one of two ends thereof pivotally connected to one of the two frames 2, a sleeve 240 rotatably mounted to the other end of the rod 241 and having an inner threaded periphery, and a threaded rod 242 which has one of two ends thereof pivotally connected to the other one of the two frames 2. The threaded rod 242 is threadedly received in the sleeve 240 so that a width opened between the two frames 2 can be adjusted by operating the sleeve 240.

An engaging means 3 is connected between the two lower ends of the frames 2 and includes a tubular retaining member 30 which has an open bottom. Two pairs of plates 31 respectively extend from the retaining member 30 so as to respectively mount to and be fixedly connected to the two frames 2 by two bolts 32 and two nuts 320. The retaining member 30 has a ring 34 mounted to a periphery defining the open bottom. A second recess 33 is defined in a peripheral wall of the retaining member 30 and communicates with the open bottom so that the connecting sphere 4 is received in the retaining member 30 via the open bottom. When the connecting sphere 4 is received in the retaining member 30, the tongue member 22 together with the frame 2 are moved to insert into the retaining member 30 via the second recess 33 so as to limit the connecting sphere by the tongue member 22.

Figure 5:
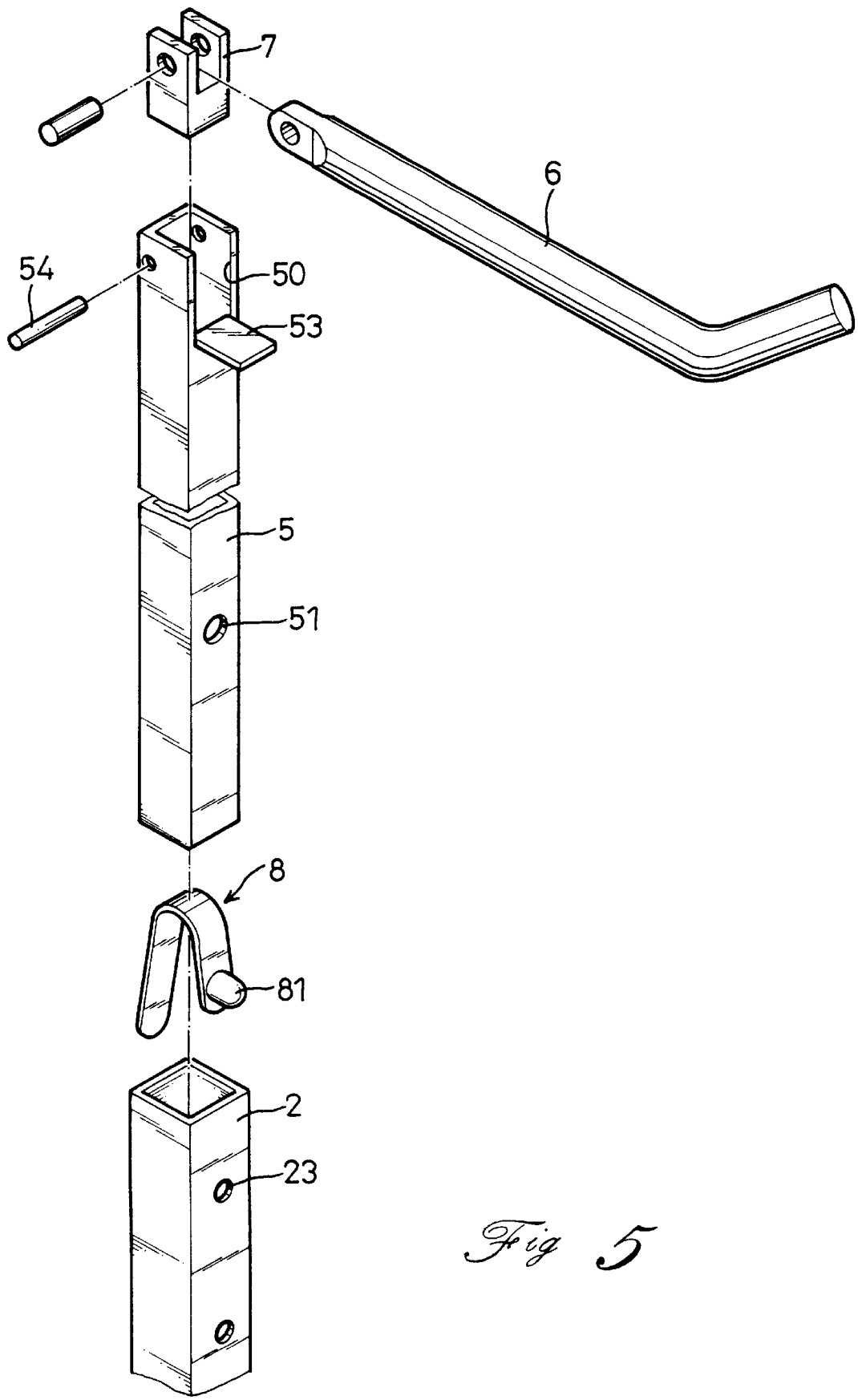
FIG. 5 is an exploded view of an upper end of one of two frames of the bicycle carrier of the present invention and a supporting member.
Figure 6:
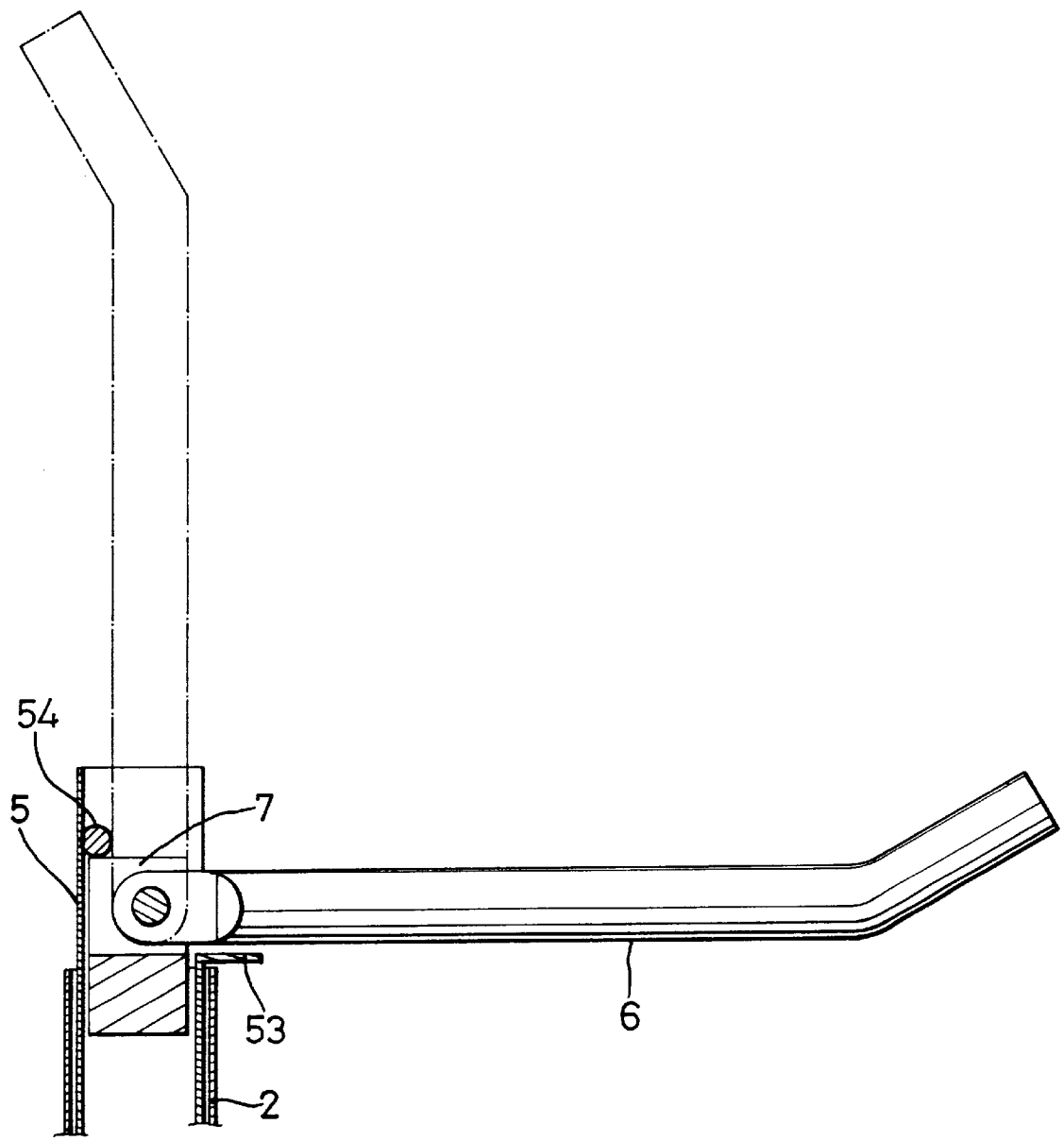
FIG. 6 is an illustrative view to show two pivoted positions of a supporting rod of the supporting member.

Referring to FIGS. 5, 6 and 7, two supporting members are respectively disposed to the two upper ends of the frames 2. Each the supporting member includes a tube 5 adjustably received in the respective upper end of the frame 2. The tube 5 has a notch 50 defined in a peripheral wall of an upper end thereof and a supporting plate 53 extends laterally from an edge defining the notch 50. Each of the tubes 5 has a hole 51 defined through the peripheral wall thereof and a block 7 slidably received therein. Each block is pivotally connected to a first end of a supporting rod 6 which has an inclined second end. Two pins 54 respectively extend through the respective peripheral wall of the upper end of the tubes 5 so as to limit each of the blocks 7 from being dropped from the upper end of the tube 5 corresponding thereto so that the supporting rods 6 and the blocks 7 are respectively retractable in the tubes 5. When in use, each the supporting rod 6 is pivotable to be supported on the supporting plate 53 corresponding thereto. Two positioning members 8 respectively and biasedly received in the two tubes 5 and each of the positioning members 8 has a boss 81 which extends trough the hole 50 of the tube 5 and one of the positioning holes 23 of the frame 2 in which the tube 5 is retractably received. Therefore, a user pushes the boss 81 to disengage the hole 51 can slidably move the tube 5 corresponding to the frame 2 till the boss 81 extends into another positioning hole 23 again so as to adjust the supporting members as shown in FIG. 7.

Figure 8:
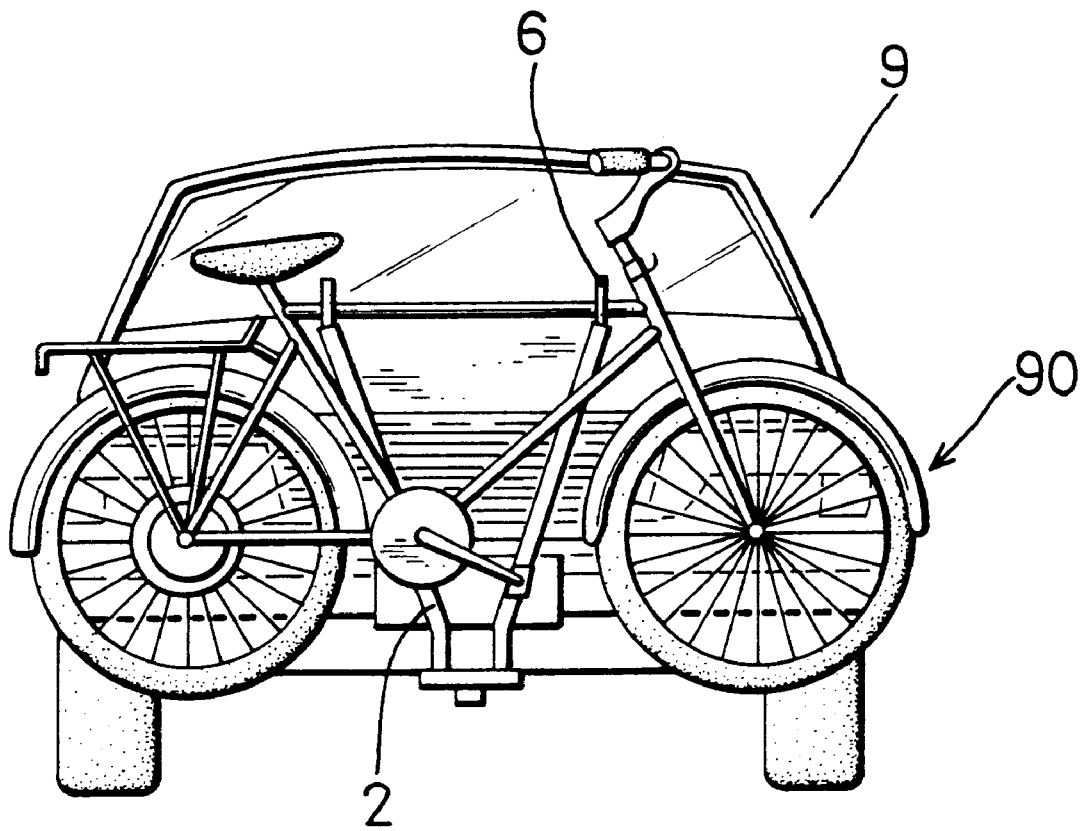
FIG. 8 is an illustrative view to show a bicycle is carried by the bicycle carrier of the present invention disposed to a car.

Referring to FIG. 8 again, a bicycle 90 can be supported on the two supporting rods 6 of the supporting members by suitably adjusting the supporting members, and the convenient design of the engaging means 3 allows the user to position and retain the connecting sphere 4 quickly and easily.

While particular embodiments of the present invention have been illustrated and described herein, it is not intended to limit the invention and changes and modifications may be made therein within the scope of the invention as hereinafter claimed.

What is claimed is:

1. A bicycle carrier for carrying a bicycle with a car which has a connecting sphere, said bicycle carrier comprising:

two frames each having a lower end and an upper end, one of said two lower ends having a tongue member extending laterally therefrom and said tongue member having a first recess defined in a distal end thereof;

a connecting means adjustably connected between said two frames;

two supporting members respectively disposed to said two upper ends of said frames, and an engaging means connected between said two lower ends of said frames and including a retaining member which has an open bottom, a second recess defined in a peripheral wall of said retaining member and communicating with said open bottom so that said connecting sphere is adapted to be received in said retaining member via said open bottom and limited by said tongue member.

2. The bicycle carrier as claimed in claim 1 wherein said retaining member has a ring mounted to a periphery defining said open bottom.

3. The bicycle carrier as claimed in claim 1 wherein said connecting means includes a rod which has one of two ends thereof pivotally connected to one of said two frames, a sleeve rotatably mounted to the other end of said rod and having an inner threaded periphery, and a threaded rod which has one of two ends thereof pivotally connected to the other one of said two frames, said threaded rod being threadedly received in said sleeve.

4. The bicycle carrier as claimed in claim 1 wherein each said supporting members includes a tube adjustably and retractably received in said respective frame, said tube having a notch defined in a peripheral wall of an upper end thereof and a supporting plate extending laterally from an edge defining said notch, two blocks respectively slidably received in said respective tubes and each block pivotally connected to a first end of a supporting rod corresponding thereto, two pins respectively extending through said respective peripheral wall of said upper end of said tubes so as to limit each of said blocks from being dropped from said upper end of said tube corresponding thereto so that said supporting rods and said blocks are respectively retractable in said tubes.

5. The bicycle carrier as claimed in claim 4 wherein each said supporting rods has an inclined second end.

6. The bicycle carrier as claimed in claim 4 wherein each said supporting rods is pivotable to be supported on said supporting plate corresponding thereto.

7. A bicycle carrier for carrying a bicycle with a car which has a connecting sphere, said bicycle carrier comprising:

two frames each having a lower end and an upper end, an engaging means disposed between said two lower ends of said two frames so that said connecting sphere is adapted to be received in said engaging means;

a connecting means adjustably connected between said two frames, and two supporting members respectively disposed to said two upper ends of said frames, each said supporting members including a tube retractably and adjustably received in said respective frame, said tube having a notch defined in a peripheral wall of an upper end thereof and a supporting plate extending laterally from an edge defining said notch, two blocks respectively slidably received in said respective tubes and each block pivotally connected to a first end of a supporting rod corresponding thereto, two pins respectively extending through said respective peripheral wall of said upper end of said tubes so as to limit each of said blocks from being dropped from said upper end of said tube corresponding thereto so that said supporting rods and said blocks are respectively retractable in said tubes.

8. The bicycle carrier as claimed in claim 7 wherein each said supporting rods has an inclined second end.

9. The bicycle carrier as claimed in claim 7 wherein each said supporting rods is pivotable to be supported on said supporting plate corresponding thereto.

10. The bicycle carrier as claimed in claim 7 wherein one of said two lower ends of said frames has a tongue member extending laterally therefrom and said tongue member has a first recess defined in a distal end thereof, said engaging means including a retaining member which has an open bottom, a second recess defined in a peripheral wall of said retaining member and communicating with said open bottom so that said connecting sphere is adapted to be received in said retaining member via said open bottom and limited by said tongue member.

11. The bicycle carrier as claimed in claim 10 wherein said retaining member has a ring mounted to a periphery defining said open bottom.

12. The bicycle carrier as claimed in claim 7 wherein said connecting means includes a rod which has one of two ends thereof pivotally connected to one of said two frames, a sleeve rotatably mounted to the other end of said rod and having an inner threaded periphery, and a threaded rod which has one of two ends thereof pivotally connected to the other one of said two frames, said threaded rod being threadedly received in said sleeve.

* * * * *